US 10,848,545 B2

(12) United States Patent
Bono et al.

(10) Patent No.: US 10,848,545 B2
(45) Date of Patent: Nov. 24, 2020

(54) MANAGING CLOUD STORAGE OF BLOCK-BASED AND FILE-BASED DATA

(71) Applicant: EMC IP Holding Company LLC, Hopkinton, MA (US)

(72) Inventors: Jean-Pierre Bono, Westborough, MA (US); Sudhir Srinivasan, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 289 days.

(21) Appl. No.: 15/884,579

(22) Filed: Jan. 31, 2018

(65) Prior Publication Data

US 2019/0238618 A1 Aug. 1, 2019

(51) Int. Cl.
*H04L 29/08* (2006.01)
*G06F 9/54* (2006.01)
*G06F 16/11* (2019.01)
*G06F 16/182* (2019.01)

(52) U.S. Cl.
CPC .............. *H04L 67/06* (2013.01); *G06F 9/547* (2013.01); *G06F 16/113* (2019.01); *G06F 16/116* (2019.01); *G06F 16/128* (2019.01); *G06F 16/183* (2019.01); *H04L 67/1097* (2013.01)

(58) Field of Classification Search
CPC ... H04L 67/06; H04L 67/1097; G06F 16/183; G06F 16/133; G06F 16/116; G06F 16/128; G06F 9/547
See application file for complete search history.

(56) References Cited

U.S. PATENT DOCUMENTS

| | | | |
|---|---|---|---|
| 7,099,957 B2 | 8/2006 | Cheline et al. | |
| 7,213,124 B2 | 5/2007 | Serizawa et al. | |
| 7,383,463 B2 | 6/2008 | Hayden et al. | |
| 7,562,216 B2 | 7/2009 | Borthakur et al. | |
| 7,631,155 B1 | 12/2009 | Bono et al. | |
| 7,739,312 B2 | 6/2010 | Gordon et al. | |
| 7,769,722 B1 | 8/2010 | Bergant et al. | |
| 7,873,700 B2 | 1/2011 | Pawlowski et al. | |
| 8,301,798 B2 | 10/2012 | Mond et al. | |
| 8,554,808 B2 | 10/2013 | Fukatani et al. | |
| 8,892,631 B2 | 11/2014 | Brown et al. | |
| 8,996,837 B1 | 3/2015 | Bono et al. | |
| 9,280,555 B1 | 3/2016 | Bono et al. | |
| 9,286,007 B1 | 3/2016 | Bono et al. | |
| 9,304,999 B1 | 4/2016 | Bono et al. | |

(Continued)

OTHER PUBLICATIONS

EMC® Cloud Tiering Appliance and Cloud Tiering Appliance/VE, Version 12.0 Getting Started Guide; Jul. 2017; 141 pages.

(Continued)

*Primary Examiner* — Philip J Chea
*Assistant Examiner* — Robert B McAdams
(74) *Attorney, Agent, or Firm* — BainwoodHuang (57) ABSTRACT

A technique for managing cloud storage provides a unified framework that supports both block-type data, such as LUNs (Logical UNits) and volumes, and file-type data, such as files, and expresses both types of data in the form of objects, which form a common base for both types of data. The framework includes a single API (application program interface) for managing storage and retrieval of block-derived objects and file-derived objects from the cloud, e.g., from a cloud-based data store.

21 Claims, 4 Drawing Sheets

(56) References Cited

U.S. PATENT DOCUMENTS

| | | |
|---|---|---|
| 9,305,009 B1 | 4/2016 | Bono et al. |
| 9,378,219 B1 | 6/2016 | Bono et al. |
| 9,424,117 B1 | 8/2016 | Bono et al. |
| 9,497,103 B2 | 11/2016 | Williams et al. |
| 9,507,787 B1 | 11/2016 | Bono et al. |
| 9,535,630 B1 | 1/2017 | Bono et al. |
| 9,635,132 B1* | 4/2017 | Lin .................. H04L 69/04 |
| 10,019,180 B1* | 7/2018 | Miah .................. G06F 3/0683 |
| 2010/0174811 A1 | 7/2010 | Musiri et al. |
| 2010/0191783 A1* | 7/2010 | Mason .............. G06F 16/1873 707/822 |
| 2010/0199042 A1* | 8/2010 | Bates .................. H04L 9/0891 711/114 |
| 2010/0241731 A1 | 9/2010 | Du et al. |
| 2010/0332401 A1* | 12/2010 | Prahlad .............. G06F 3/0649 705/80 |
| 2012/0016838 A1 | 1/2012 | Arai et al. |
| 2013/0007219 A1* | 1/2013 | Sorenson .............. H04L 67/28 709/219 |
| 2015/0269213 A1 | 9/2015 | Avati |
| 2016/0179826 A1 | 6/2016 | Batra |
| 2016/0210308 A1* | 7/2016 | Shekhar .............. G06F 16/116 |
| 2017/0185605 A1 | 6/2017 | Higuchi et al. |
| 2019/0213265 A1 | 7/2019 | Boerner et al. |

OTHER PUBLICATIONS

EMC® VNX™ Series Release to Configuring Virtual Data Movers on VNX™; Feb. 2011; 80 Pages.
EMC VNX Snapshots; Dec. 2013; 57 pages.
EMC VNX Replication Technologies; Nov. 2015; 34 pages.
Dell EMC Cloudarray: Cloud-Intergrated Storage; 3 pages.
VMAX3 and VMAX All Flash With Cloudarray Hypermax OS Integration with CloudArray; Sep. 2016; 11 pages.
Dell EMC Unity: Cloud Tiering Appliance (CTA) A Detailed Review; Nov. 2017; 29 pages.
Using EMC®Celerra Replicator™ (V2); Feb. 2009; 184 pages.
"Configuring NFS on VNX™," EMC® VNX™ Series, Release 7.1, EMC Corporation, 1998, 150 pages.
Bono, et al., "Unified Datapath Processing With Virtualized Storage Processors," U.S. Appl. No. 13/828,294, filed Mar. 14, 2013.
Bono, et al., "Providing Virtual Storage Processor (VSP) Mobility With Induced File System Format Migration," U.S. Appl. No. 14/041,097, filed Sep. 30, 2013.
Herbert Potzl, Marc E. Fluczynski; "Linux-VServer"; "Proceedings of the Linux Symposium" vol. Two; Jun. 27-30, 2007; pp. 151-160.

* cited by examiner

FIG. 1

Policies 162

| Cloud-Based Storage Operation (210) | Selection Criteria (220) | Timing (230) |
|---|---|---|
| File Tiering | Inactive for M months | Monthly |
| Volume/LUN Tiering | Inactive for W weeks | Weekly |
| NAS Server Tiering | Admin Selected | On Demand |
| VM Tiering | Admin Selected | On Demand |
| Snapshot Shipping to Cloud (Volume) | Admin Selected | Daily |
| Snapshot Shipping to Cloud (FS) | Admin Selected | Daily |
| Snapshot Shipping to Cloud (NAS) | Admin Selected | Daily |

Initiated by Scheduler 164

MANAGING CLOUD STORAGE OF BLOCK-BASED AND FILE-BASED DATA

BACKGROUND

Data storage systems are arrangements of hardware and software that include storage processors coupled to arrays of non-volatile storage devices, such as magnetic disk drives, electronic flash drives, and/or optical drives, for example. The storage processors service storage requests, arriving from host machines ("hosts"), which specify files or other data elements to be written, read, created, deleted, and so forth. Software running on the storage processors manages incoming storage requests and performs various data processing tasks to organize and secure the data elements stored on the non-volatile storage devices.

Some data storage systems employ cloud-based storage resources in addition to local storage. For example, DELL EMC CloudArray supports cloud-based storage of LUNs (Logical UNits) and makes the LUNs available using conventional block-based protocols, such as iSCSI (Internet Small Computer System Interface), Fibre Channel, and the like. CloudArray supports in-cloud snapshots and is compatible with Amazon S3 (Simple Storage Services). In addition, DELL EMC Cloud Tiering Appliance (CTA) supports file tiering to the cloud by identifying files that fit administrator-defined criteria and moving the file data to the cloud. For example, CTA replaces a file's data with a stub that points to the data in the cloud while retaining the usual access path to the file in the storage system. This arrangement enables users to access the file from the storage system as if the file were local, even though the file's data resides in the cloud. Both CloudArray and CTA support numerous cloud providers, such as Microsoft Azure, Dell EMC ECS (Elastic Cloud Storage), Virtustream, and many others. In addition, both CloudArray and CTA support both public cloud and private cloud solutions.

SUMMARY

Unfortunately, no single solution is currently available for enabling cloud storage of the diverse types of data that modern data storage systems support. Although CloudArray offers a solution for LUNs and CTA offers a solution for files, there has been no common framework to support cloud storage for both, or for additional types of data. In addition, the segregation of block-based cloud storage from file-based cloud storage has given rise to certain solutions that are non-optimal, such as the need to translate data from block-based to file-based, or vise-versa, to enable a particular cloud storage solution to operate.

In contrast with prior approaches, which provide different cloud solutions for different types of data, an improved technique for managing cloud storage provides a unified framework that supports both block-type data, such as LUNs (Logical UNits) and volumes, and file-type data, such as files, and expresses both types of data in the form of objects, which form a common base for both types of data. The framework includes a single API (application program interface) for managing storage and retrieval of block-derived objects and file-derived objects from the cloud, e.g., from a cloud-based data store.

Advantageously, the improved technique provides a unified framework for cloud-based storage, which addresses a wide range of cloud storage requirements, simplifies management and administration, and avoids the need for inefficient solutions that require conversions of data from block-type to file-type, or vise-versa.

In some examples, the improved technique employs a VTO (volume-to-object) component and an FTO (file-to-object) component. The VTO component converts between volumes (or LUNs) and corresponding objects in the cloud, by expressing volumes as corresponding sets of objects in the cloud and by reconstituting volumes from the corresponding sets of objects. Likewise, the FTO component converts between files and corresponding objects, by expressing the files as corresponding sets of objects in the cloud and reconstituting the files from the corresponding sets of objects. The terms "volume" and "LUN" may be used interchangeably herein to refer to block-addressable storage elements.

In some examples, the improved technique further employs decision logic configured to select between the VTO component and the FTO component based on particular cloud-storage use cases. For example, the decision logic is configured to select the VTO component for LUN archiving and snapshot shipping of LUNs and file systems, but to select the FTO component for file tiering and archiving. Thus, the decision logic may be configured to select the most efficient conversion (VTO or FTO) for the particular use case in question.

In some examples, the VTO component, FTO component, and cloud API are provided together in a single cloud management appliance (CMA). The CMA may reside in its own container or virtual machine, which may communicate with other components of a data storage system over an interface, such as a REST (representational state transfer) interface.

According to some variants, the CMA includes a set of policies and a scheduler. An administrator may specify policies for cloud-based storage, and the scheduler may implement such policies, e.g., by activating on a scheduled basis, communicating with data storage system components, identifying data to be moved to the cloud, and effecting any transfers via the VTO component or the FTO component, and the API. In this manner, the CMA may run alongside the other data storage system components, managing cloud storage on behalf of the data storage system components with only a minimal burden on the data storage system components themselves.

Certain embodiments are directed to a method of managing cloud-based data storage. The method includes operating an FTO (file-to-object) component on a computing machine. The FTO component is configured to convert between files hosted by a data storage system and cloud-based objects that store contents of the files. The cloud-based objects that store contents of the files are accessible to the data storage system via a cloud-based API (application program interface) component running on the computing machine. The method further includes operating a VTO (volume-to-object) component on the computing machine. The VTO component is configured to convert between volumes hosted by the data storage system and cloud-based objects that store contents of the volumes. The cloud-based objects that store contents of the volumes are accessible to the data storage system via the cloud-based API component. In response to a request from the data storage system to access a file, the method further includes (i) transforming, by the FTO component, the request to access the file into a corresponding set of requests to access a first set of cloud-based objects and (ii) accessing, by the cloud-based API component, the first set of cloud-based objects to obtain data of the file from a set of cloud-based data stores. Further, in response to a request from the data storage system to access a volume, the method still further includes (i) transforming, by the VTO component, the request to access the volume into a corresponding set of requests to access a second set of cloud-based objects and (ii) accessing, by the cloud-based API component, the second set of cloud-based objects to obtain data of the volume from the set of cloud-based data stores.

Other embodiments are directed to a computerized apparatus constructed and arranged to perform a method of managing cloud-based data storage, such as the method described above. Still other embodiments are directed to a computer program product. The computer program product includes a set of non-transient, computer-readable media that store instructions which, when executed by control circuitry of a computerized apparatus, cause the computerized apparatus to perform a method of managing cloud-based data storage, such as the method described above.

The foregoing summary is presented for illustrative purposes to assist the reader in readily grasping example features presented herein; however, the foregoing summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION OF THE INVENTION

Embodiments of the invention will now be described. It should be appreciated that such embodiments are provided by way of example to illustrate certain features and principles of the invention but that the invention hereof is not limited to the particular embodiments described.

An improved technique for managing cloud storage provides a unified framework that supports both block-type data, such as LUNs (Logical UNits) and volumes, and file-type data, such as files, and expresses both types of data in the form of objects, which form a common base for both types of data. The framework includes a single API (application program interface) for managing storage and retrieval of block-derived objects and file-derived objects from the cloud, e.g., from a cloud-based data store.

Figure 1:
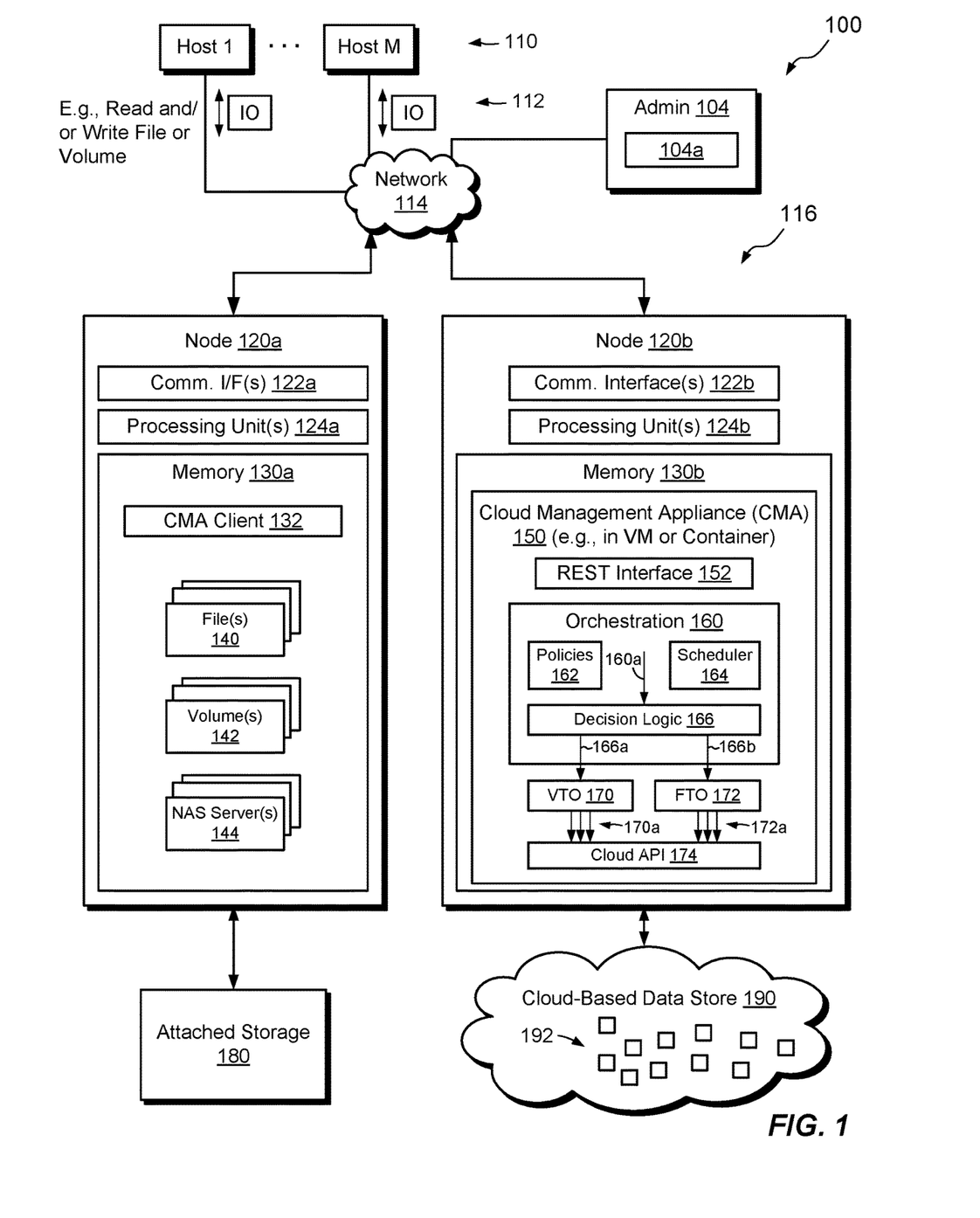
FIG. 1 is a block diagram of an example environment in which embodiments of the improved technique hereof can be practiced.

FIG. 1 shows an example environment 100 in which embodiments of the improved technique hereof can be practiced. Here, multiple host computing devices ("hosts") 110 access a data storage system 116 over a network 114. An administrative machine 104, which runs an administrative program 104a, may also connect to the data storage system 116 over the network 114. The data storage system 116 may include any number of computing nodes, with two nodes 120a and 120b specifically shown. The first node 120a is configured to process host I/O requests 112, such as read requests and write requests, and is coupled to attached storage 180, such as one or more magnetic disk drives, solid-state drives, and the like. In an example, the first node 120a is connected to the attached storage 180 using cables or via a SAN (storage area network). The second node 120b is configured to access cloud storage and is coupled to a cloud-based data store 190, e.g., over a LAN (local area network) or WAN (wide area network), such as the Internet. The cloud-based data store 190 may be part of a public cloud or a private cloud and may be provided by any suitable platform, such as Amazon Cloud Services (ACS), Microsoft Azure, Dell EMC Elastic Cloud Services (ECS), and the like. In an example, the cloud-based data store 190 stores data in the form of objects 192. Although a single cloud-based data store 190 is shown, one should appreciate that node 120b may connect to any number of cloud-based data stores to support cloud-based storage of locally hosted data. For example, different cloud-based data stores may provide different levels of performance.

Each of the nodes 120a and 120b includes a set of communication interfaces (122a or 122b), such as one or more network interface adapters for converting electronic and/or optical signals received over the network 114 to electronic form for use by the respective node. Each of the nodes 120a and 120b further includes a set of processing units (124a or 124b) and memory (130a or 130b). Each set of processing units 124a and 124b includes one or more processing chips and/or assemblies. In a particular example, each set of processing units includes numerous multi-core CPUs. Each of the memories 130a and 130b includes both volatile memory (e.g., RAM), and non-volatile memory, such as one or more ROMs, disk drives, solid state drives, and the like. In each node, the set of processing units and the memory together form control circuitry, which is constructed and arranged to carry out various methods and functions as described herein. Each of the memories 130a and 130b includes a variety of software constructs realized in the form of executable instructions. When the executable instructions are run by the respective set of processing units 124a or 124b, the set of processing units is made to carry out the operations defined by the software constructs. Although certain software constructs are specifically shown and described, it is understood that each memory typically includes many other software constructs, which are not shown, such as various applications, processes, and daemons. Further, one should appreciate that the use of two nodes 120a and 120b is merely illustrative, as the data storage system 116 may include any number of nodes, including a single node.

As further shown in FIG. 1, the memory 130a of node 120a "includes," i.e., realizes by execution of software instructions, a CMA (cloud management appliance) client 132, which is configured to operate in coordination with a CMA 150 on node 120b. The memory 130a also includes various data elements, such as files 140, volumes 142, and NAS servers 140. Any number of files 140, volumes 142, and/or NAS servers 144 may be provided. As is known, a "NAS server" is a collection of file systems, one or more network servers, and settings, which a data storage system may serve to one or more users or groups. Additional information about NAS servers may be found in co-pending U.S. application Ser. No. 15/664,366, filed Jul. 31, 2017, and entitled "MANAGING DATA USING NETWORK ATTACHED STORAGE (NAS) CLUSTER," the contents and teachings of which are incorporated herein by reference.

In an example, the files 140, volumes 142, and NAS servers 144 are "hosted" by the data storage system 116, meaning that hosts 110 can access these data elements from the data storage system 116 using I/O requests 112. The actual data and/or metadata that backs the files 140, volumes 142, and/or NAS servers 144 may reside locally, e.g., in attached storage 180, may reside remotely, such as in the cloud, or may reside partially in local storage and partially remotely. The memory 130a may store metadata structures supporting access to files 140, volumes 142, and NAS servers 144. Such metadata structures may establish a namespace for data elements and include stubs or other pointers to local and/or remote storage. Although not shown, memory 130a may include software for managing access to data elements, such as I/O processing elements, a file system manager, mapping, and various drivers.

Turning now to node 120b, memory 130b is seen to include the above-described CMA (cloud management appliance) 150. The CMA 150 includes a REST (representational state transfer) interface 152, e.g., for communicating with the CMA client 132 in memory 130a). The CMA 150 further includes an orchestration component 160, a VTO (volume-to-object) component 170, an FTO (file-to-object) component 172, and a cloud API (application program interface) 174. The orchestration component 160 is configured to carry out cloud-storage operations and activities. For example, the orchestration component 160 is configured with a set of policies 162, a scheduler 164, and decision logic 166. The policies 162 specify criteria for performing cloud-based operations, such as criteria for selecting data elements to move, archive, or snapshot to the cloud. The scheduler 164 is configured to perform designated cloud-based operations on a predetermined schedule, or on different schedules for different data elements, in accordance with the policies 162. For example, the scheduler 164 may be configured to activate at certain times and/or at certain frequencies, query data storage components, such as those on node 120a, identify data elements that are subject to cloud-based operations, and direct performance of those operations in accordance with the policies 162. Further, the decision logic 166 is configured to select between the VTO 170 and the FTO 172 for performing the designated cloud-based operations. For example, decision logic 166 may be configured to select the VTO 170 if the data element upon which a cloud-based operation is to be performed is a volume or a LUN (block-based), and to select the FTO 172 if the data element upon which a cloud-based operation is to be performed is a file (file-based).

The VTO component 170 is configured to convert between block-based (e.g., volume or LUN) semantics and object-based semantics used by object-based cloud storage services. For example, the VTO component 170 may express a volume or LUN as a set of objects (i.e., one or more objects) for storage in an object-based data store in the cloud. Likewise, the VTO component 170 may assemble a set of objects from the cloud to constitute a volume or LUN, such that the volume or LUN can be accessible from the namespace of the data storage system 116, e.g., in response to block-based I/O requests 112 (e.g., Fibre Channel and/or iSCSI protocols). The VTO component 170 thus enables reading, writing, creation, and deletion of block-based data elements hosted by the data storage system 116 but backed in the cloud. A suitable VTO component 170 that meets the above requirements may be found in the CloudArray appliance, which is available commercially from Dell EMC of Hopkinton, Mass.

The FTO component 172 is configured in a corresponding manner but for file-based data. For example, the FTO component 172 is configured to convert between file-based semantics and object-based semantics used by object-based cloud storage services. The FTO component 172 may express a file as a set of objects, such as one or more objects for data and another object for metadata. Likewise, the FTO component 172 may assemble a set of objects from the cloud to constitute a file, such that the file can be accessible from the namespace of the data storage system 116, e.g., via I/O requests 112 arriving in NFS (Network File System) and/or CIFS (Common Internet File System) protocol, for example. The FTO component 172 thus enables reading, writing, creation, and deletion of file-based data elements hosted by the data storage system 116 but backed in the cloud. A suitable FTO component 172 that meets the above requirements may be found in the Cloud Tiering Appliance (CTA), which is available commercially from Dell EMC of Hopkinton, Mass.

The cloud API component 174 is configured as a common interface to the cloud-based data store 190 (or to multiple such data stores). For example, the cloud API component 174 acts as an interface between both the VTO component 170 and the FTO component 172 and the cloud-based data store 190. To this end, the cloud API component 174 may support conventional object-based semantics, such as GET, PUT, SELECT, POST, DELETE, etc., and provides a software construct through which object-based data may be passed between the data storage system 116 and the cloud-based data store 190. A suitable example of the cloud API component 174 is the Amazon S3 API, available from Amazon Web Services (AWS).

In an example, the CMA 150 is implemented within a virtualized processing instance, such as a virtual machine or a container, such as a Docker container. As is known, containers provide isolated userspace instances but do not virtualize operating system kernels. By contrast, virtual machines virtualize entire operating systems, including userspace and kernel space.

In some examples, the administrative program 104a is dedicated to control of the CMA 150. For example, administrators may run the program 104a to establish policies and to specify particular actions for supporting cloud-based storage. In such cases, the administrative program 104a is separate from a more generalized program (e.g., Unisphere), which provides administrative control over more conventional data storage features. In other examples, the administrative program 104a integrates conventional data storage features with support for the CMA 150. For example, Unisphere or some other management program may be adapted to include administration of the CMA 150.

The CMA 150 may reside on a dedicated computing node, as shown, or it may reside alongside other containers, virtual machines, or software structures in a shared computing node, where each computing node is understood to be a separate computer or blade. For example, the CMA 150 may reside within node 120a, alongside other data-storage software. In some examples, the CMA 150 operates as a service on behalf of multiple data storage systems. For example, any number of data storage systems may connect to the CMA 150 and use the CMA 150 as an interface between the respective data storage systems and the cloud.

In example operation, node 120*a* in the data storage system 116 receives I/O requests 112 from hosts 110. The I/O requests 112 include read requests and/or write requests directed to any of files 140, volumes 142, and/or contents of NAS servers 144. The communication interface(s) 122*a* receive the I/O requests 112, and the node 120*a* initiates further processing. Such processing may include fulfilling the requested read and/or write requests by reading and/or writing corresponding structures in the attached storage 180, for locally stored data elements, and/or by reading and/or writing corresponding structures in the cloud-based data store 190, for cloud-backed data elements.

For example, to process a read request 112 directed to a volume backed in the cloud-based data store 190, the node 120*a* may perform a look-up of the volume in a local namespace of the data storage system 116, encounter a stub, and issue an instruction to follow the stub to the underlying data. The act of following the stub may involve contacting the CMA 150, forwarding the read request (arrow 160*a*), invoking the decision logic 166, selecting the VTO 170 by the decision logic (arrow 166*a*), and converting the specified read request into a corresponding set of read requests 170*a* of one or more objects. The cloud API component 174 then contacts the cloud-based data store 190 and obtains the requested object or objects. Once the object or objects have been received, the cloud API component 174 passes the returned object or objects back to the VTO component 170, which reassembles them to reconstitute the requested volume, enabling the node 120*a* to return the requested data to the requesting host 110.

A corresponding procedure is used for reading file data. To read a file backed in the cloud-based data store 190, the node 120*a* may perform a look-up of the file in a local file-system structure, encounter a stub, and issue an instruction to follow the stub to the underlying data. Following the stub may involve contacting the CMA 150, forwarding the read request (arrow 160*a*), invoking the decision logic 166 (arrow 160*a*), selecting the FTO 172 by the decision logic (arrow 166*a*), and converting the specified read request into a corresponding set of read requests 172*a* of one or more objects. The cloud API component 174 may then contact the cloud-based data store 190 and obtain the requested object or objects. Once the object or objects have been received, the cloud API component 174 passes the returned object or objects back to the FTO component 172, which reassembles them to reconstitute the requested file, enabling the node 120*a* to return the requested file data to the requesting host 110.

Similar activities may be performed for writes. For example, to respond to an I/O request 112 specifying a write to a volume or file, the data of the volume or file may be retrieved from the cloud-based data store 190, as described above, and the data element may be reconstituted by the applicable VTO or FTO component and updated with the data specified in the write request 112. The updated data element may then be converted back to one or more objects (by the applicable VTO or FTO component) and written out to the cloud-based data store 190 via the cloud API component 174.

In addition to supporting reads and writes, the CMA 150 may support numerous other cloud-storage operations. These may include, for example, the following services, which are presented for illustration and without any intent to be limiting or complete:

File tiering: Policy-based transfer of file data from local storage 180 to cloud-based data store 190. May include orphan management (when files are locally deleted) and optimized local write performance against archived files (e.g., by local caching).

Volume/LUN tiering: Policy-based transfer of volume or LUN data from local storage 180 to cloud-based data store 190.

NAS server tiering: Policy-based transfer of NAS server data, including data of any or all file systems of a NAS server, from local storage 180 to cloud-based data store 190.

Virtual machine tiering: Policy-based transfer of data supporting a virtual machine from local storage 180 to cloud-based data store 190. For virtual machines implemented as files (e.g., VMDK files), one may regard virtual machine tiering as a specific example of file tiering. For virtual machines implemented as block-based objects (e.g., block-based VVOLs), one may regard virtual machine tiering as a specific example of volume tiering.

Primary cloud storage of files, volumes, NAS servers, and/or virtual machines: Creation of primary versions of data elements in the cloud-based data store 190.

Snapshot shipping of volumes to the cloud: Policy based storage of snapshots (point-in-time versions) of volumes or LUNs in the cloud-based data store 190. May be performed, for example, by establishing a mirror between a locally-backed volume or LUN and a corresponding cloud-backed volume/LUN, and then directing the VTO component 170 to generate a snapshot of the cloud-backed volume in the cloud on a policy-driven basis.

Snapshot shipping of file systems to the cloud: Policy based storage of snapshots (point-in-time versions) of file systems in the cloud-based data store 190. May be performed, for example, by establishing a mirror between a volume supporting the file system and a corresponding cloud-backed volume, and then directing the VTO component 170 to generate a snapshot of the cloud-backed volume in the cloud on a policy-driven basis.

Snapshot shipping of NAS servers to the cloud: Policy based storage of snapshots (point-in-time versions) of all file systems of a NAS server in the cloud-based data store 190. May be performed, for example, by establishing a mirror between the volume supporting each file system in the NAS server and a corresponding cloud-backed volume, and then directing the VTO component 170 to generate a group snapshot of all the cloud-backed volumes of the NAS server in the cloud on a policy-driven basis.

The CMA 150 may thus operate as a complement to conventional data storage services, but with the particular focus of managing interactions with cloud-based storage.

Figure 2:
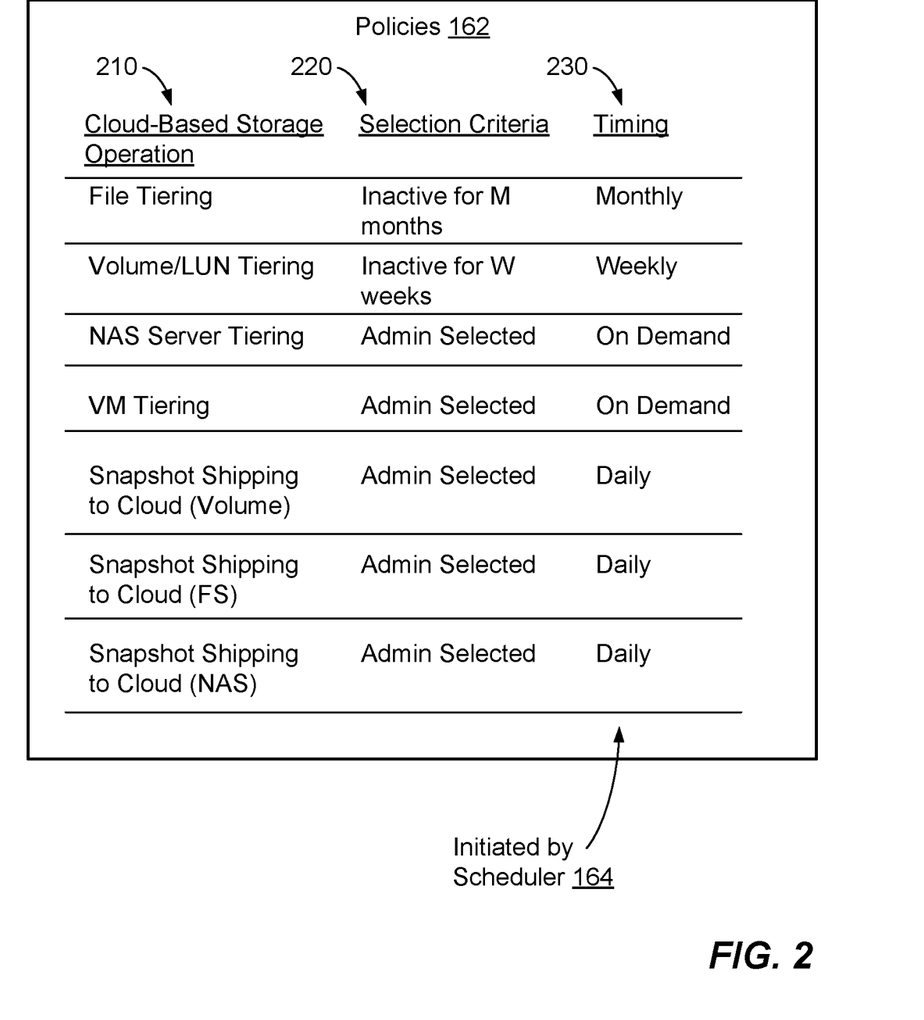
FIG. 2 is a diagram showing example contents of a set of policies as shown in FIG. 1.

FIG. 2 shows example features of the policies 152 of FIG. 1 in additional detail. Here, the policies 162 identify, for each of multiple cloud-storage operations 210, corresponding selection criteria 220 for selecting data elements on which to perform the cloud-storage operations 210, and corresponding timing 230 when the cloud-storage operations 210 that are selected in accordance with the selection criteria 220 are performed. For example, the policies 162 may prescribe that file tiering is to be performed only on files that are inactive for some number "M" months (criteria 220) and that such file tiering is to be initiated on a monthly basis (timing 230). Likewise, the policies 162 may prescribe that volume/LUN tiering is to be performed only on volumes or LUNs that have been inactive for "W" weeks and that such volume/LUN tiering is to be initiated on a weekly basis.

One should appreciate that the examples shown are highly simplified for purposes of illustration. For example, policies 162 may specify multiple criteria 220 for a given cloud-based storage operation 210, which may include such considerations as owner, age, size, storage location, and the like, and may specify different timings for different criteria. Criteria 220 may be combined, e.g., using Boolean logic or in other ways. Some cloud-based storage operations 210 may be performed "On Demand," rather than on any repeating schedule, where an on-demand operation may require an explicit administrator instruction. For scheduled operations 210, the scheduler 164 may self-activate, query the CMA client 132 on node 120a, identify any data elements that meet the specified criteria 220, and initiate performance of the specified operation on the identified data elements. For instance, every month the scheduler 164 may wake up, check for files 140 that have been inactive for M months, and direct the orchestration component 160 to move the data of any such files to the cloud-based data store 190, e.g., by inserting stubs in an I/O paths to the data of the files and directing the FTO component 172 to store the file data in objects 192.

One should appreciate that performance of the cloud-based storage operations 210 is preferably asynchronous to operations being conducted on the data storage component running on node 120a. Thus, for example, the cloud-based storage operations 210 directed by the orchestration component 160 may run in parallel with usual data storage operations (e.g., servicing I/O requests 112) while minimally interfering with such operations.

Figure 3:
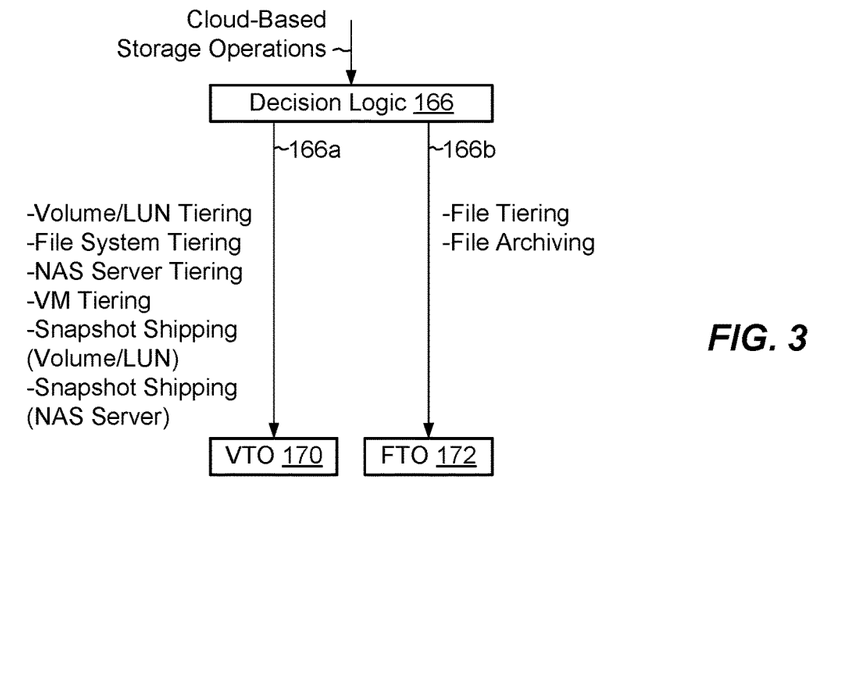
FIG. 3 is a flow diagram showing example selections of decision logic of FIG. 1 for directing different cloud-storage operations to either a VTO (volume-to-object) component or to an FTO (file-to-object component).

FIG. 3 shows example action of the decision logic 166 of FIG. 1. Here, the decision logic 166 is configured to direct cloud-based storage operations 160a either to the VTO component 170 or the FTO component 172, depending, for example, on rules encoded in the decision logic 166. In general, the decision logic 166 is configured to select the most efficient component, VTO or FTO, for the particular operation at hand. The logic generally selects the VTO component 170 when the data element to be accessed in the cloud is block-based (e.g., a volume or LUN) and selects the FTO component 170 when the data element to be accessed in the cloud is file-based (e.g., a file); however, this is not always the case. For example, and as shown in the figure, the decision logic 166 selects the VTO 170 for file system tiering, NAS server tiering, and snapshot shipping of NAS servers. This is the case despite the fact that file systems and NAS servers are composed of files, i.e., file-based data. The reason for the apparent mismatch is that file systems are typically built upon volumes, and the volumes typically store all the data and metadata of the file systems. By using the VTO component 170, archiving and snapshot shipping of file systems and NAS servers can be most efficiently accomplished.

Figure 4:
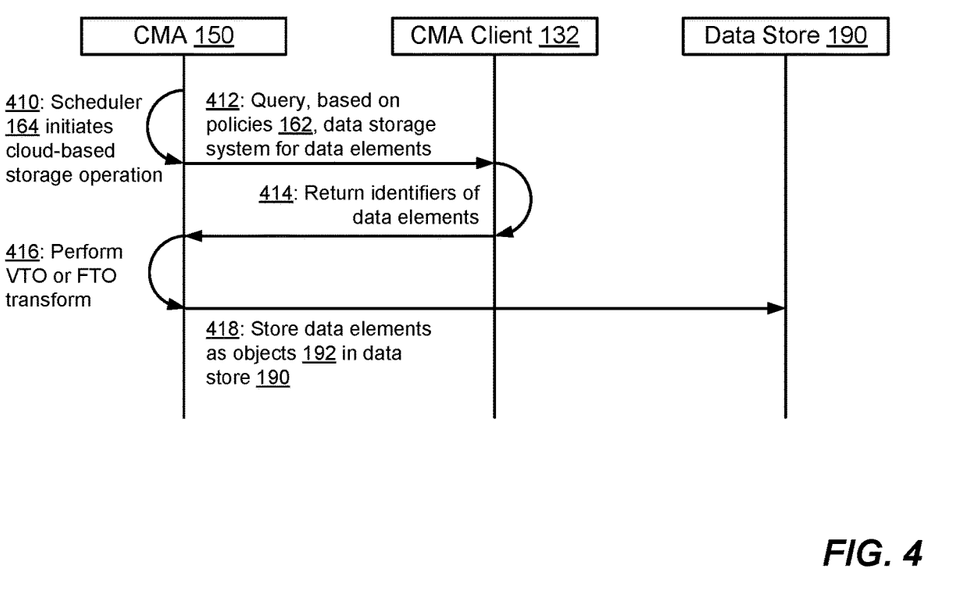
FIG. 4 is a sequence diagram showing example activities for performing cloud-based storage operations in the environment of FIG. 1.

FIG. 4 shows a sequence diagram of example activities conducted among the CMA 150, CMA client 132, and cloud-based data store 190. The pictured activities depict a typical manner in which cloud-based storage operations 210 (FIG. 2) may be initiated and performed to place data of block-based data or file-based data in the cloud.

At 410, the scheduler 164 self-activates and initiates a cloud-based storage operation 210. For example, the scheduler 164 wakes up on a monthly basis to perform an operation defined to occur monthly, or wakes up on a weekly basis to perform an operation defined to occur weekly.

At 412, the CMA 150 sends a query, e.g., over REST interface 152, to the CMA client 132. The query specifies criteria 220 for selecting data elements on which to perform the designated cloud-based storage operation 210. The CMA client 132 runs the query, e.g., by traversing a namespace of the data storage system 116, and returns identifiers of matching data elements, i.e., data elements that meet the selection criteria 220 for that cloud-based storage operation 210.

At 416, the CMA 150 performs a VTO or FTO transform (as appropriate, using the VTO component 170 or FTO component 172) on each of the matching data elements, to render each of the matching elements as a corresponding set of objects.

At 418, the CMA 150 operates the cloud API component 174 to store each corresponding set of objects in the cloud-based data store. Once storage is complete, the scheduler 164 may assume a sleep state until the occurrence of a next scheduled operation.

Figure 5:
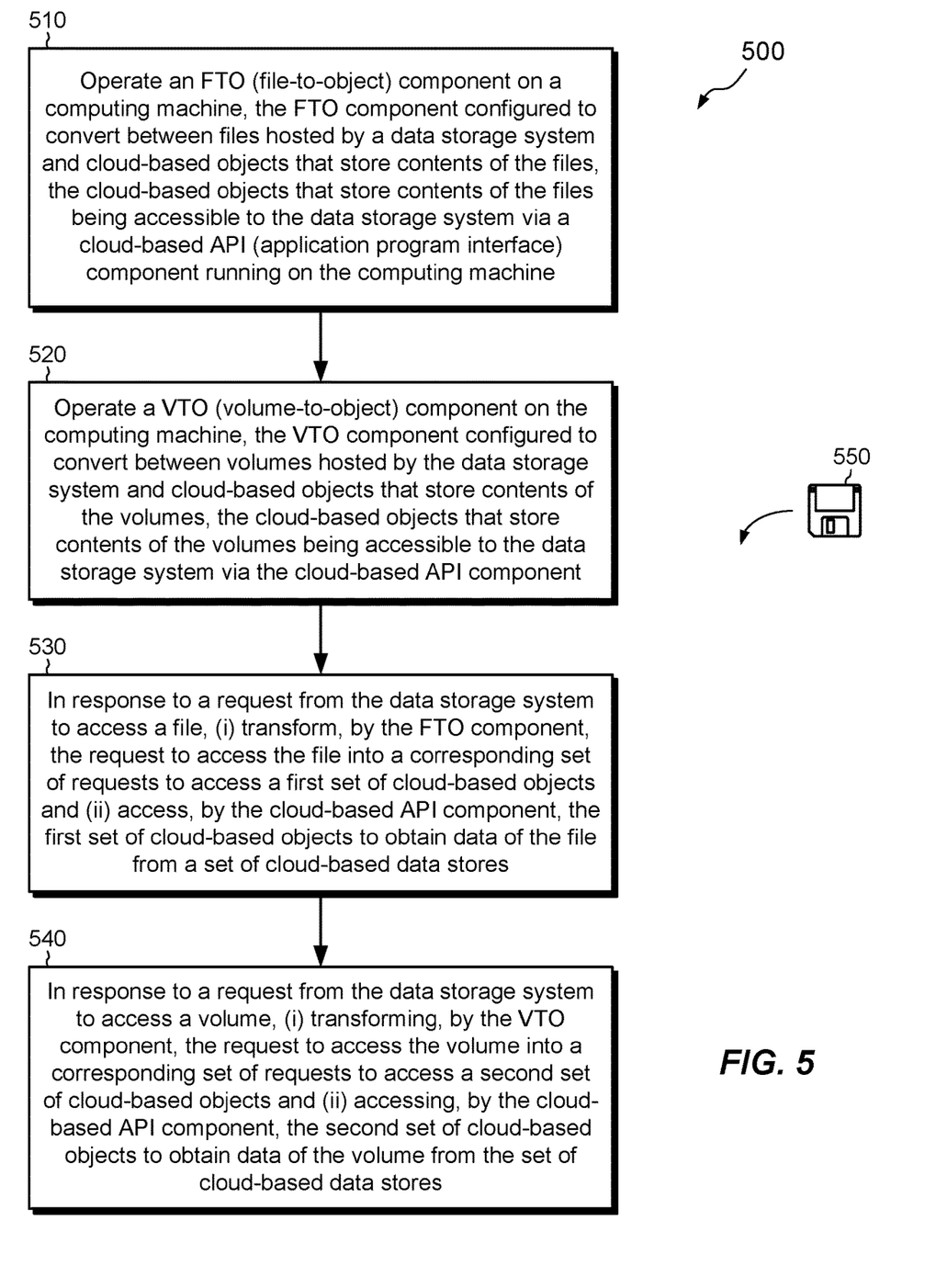
FIG. 5 is a flowchart showing an example method of managing cloud-based storage.

FIG. 5 shows an example method 500 that may be carried out in connection with the environment 100 and provides a summary of some of the activities described above. The method 500 is typically performed, for example, by the software constructs described in connection with FIG. 1, which reside in the memories 130a and 130b of the respective nodes 120a and 120b and are run by the respective sets of processing units 124a and 124b. The various acts of method 500 may be ordered in any suitable way. Accordingly, embodiments may be constructed in which acts are performed in orders different from that illustrated, which may include performing some acts simultaneously.

At 510, an FTO (file-to-object) component 172 is operated on a computing machine 120b. The FTO component 172 is configured to convert between files 140 hosted by a data storage system 116 and cloud-based objects 192 that store contents of the files 140. The cloud-based objects 192 that store contents of the files 140 are accessible to the data storage system 116 via a cloud-based API (application program interface) component 174 running on the computing machine 120b.

At 520, a VTO (volume-to-object) component 170 is operated on the computing machine 120b. The VTO component 170 is configured to convert between volumes 142 hosted by the data storage system 116 and cloud-based objects 192 that store contents of the volumes 142. The cloud-based objects 192 that store contents of the volumes 142 are accessible to the data storage system 116 via the cloud-based API component 174.

At 530, in response to a request 160a from the data storage system 116 to access a file 140 (e.g., based on an I/O request 112 specifying a read of the file's data), (i) the FTO component 172 transforms the request 160a to access the file 140 into a corresponding set of requests 172a (e.g., one or more requests) to access a first set of cloud-based objects 192 and (ii) the cloud-based API component 174 accesses the first set of cloud-based objects 192 to obtain data of the file 140 from a set of cloud-based data stores 190.

At 540, in response to a request 160a from the data storage system 116 to access a volume 142 (e.g., based on an I/O request 112 specifying a read of the volume's data), (i) the VTO component 170 transforms the request 160 to access the volume 142 into a corresponding set of requests 170a to access a second set of cloud-based objects 192 and (ii) the cloud-based API component 174 accesses the second set of cloud-based objects 192 to obtain data of the volume 142 from the set of cloud-based data stores 190.

An improved technique for managing cloud storage has been described, which provides a unified framework that supports both block-type data, such as LUNs (Logical UNits) and volumes, and file-type data, such as files, and expresses both types of data in the form of objects 192, which form a common base for both types of data. The framework includes a single API (application program interface) 174 for managing storage and retrieval of block-derived objects and file-derived objects from the cloud, e.g., from a cloud-based data store 190 or from multiple such data stores.

Having described certain embodiments, numerous alternative embodiments or variations can be made. For example, although the data storage system 116 is seen to include attached storage 180, this is merely an example. Alternatively, embodiments of the invention hereof may be practiced even if no attached storage 180 is present.

Further, although the data storage system 116 is shown as being of a conventional design, embodiments of the invention hereof may be employed with a wide range of storage systems of different designs, such as with storage arrays of various performance levels, with software-defined storage (SDS), or with combinations of conventional data storage hardware and SDS.

Some implementations may be realized partially or entirely in the cloud. For example, the CMA 150 may run within a virtual machine that runs on a server in the cloud. Likewise, the functions attributed to 120a may be provided on a server in the cloud, which may be the same server that runs the CMA 150, or a different server.

Further, although features are shown and described with reference to particular embodiments hereof, such features may be included and hereby are included in any of the disclosed embodiments and their variants. Thus, it is understood that features disclosed in connection with any embodiment may be included with any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 550 in FIG. 5). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing cloud-based data storage, the method comprising:
    operating an FTO (file-to-object) component on a computing machine, the FTO component configured to convert between files hosted by a data storage system and cloud-based objects that store contents of the files, the cloud-based objects that store contents of the files being accessible to the data storage system via a cloud-based API (application program interface) component running on the computing machine;
    operating a VTO (volume-to-object) component on the computing machine, the VTO component configured to convert between volumes hosted by the data storage system and cloud-based objects that store contents of the volumes, the cloud-based objects that store contents of the volumes being accessible to the data storage system via the cloud-based API component;
    in response to a request from the data storage system to access a file, (i) transforming, by the FTO component, the request to access the file into a corresponding set of requests to access a first set of cloud-based objects and (ii) accessing, by the cloud-based API component, the first set of cloud-based objects to obtain data of the file from a set of cloud-based data stores; and
    in response to a request from the data storage system to access a volume, (i) transforming, by the VTO component, the request to access the volume into a corresponding set of requests to access a second set of cloud-based objects and (ii) accessing, by the cloud-based API component, the second set of cloud-based objects to obtain data of the volume from the set of cloud-based data stores.

2. The method of claim 1, further comprising operating the FTO component, the VTO component, and the cloud-based API component together within a CMA (cloud management appliance), the CMA operating within a virtualized processing instance on the computing machine, the virtualized processing instance realized as one of (i) a virtual machine or (ii) a container that provides an isolated user-space instance.

3. The method of claim 2, wherein the computing machine is one of multiple hardware computing nodes that operate within the data storage system.

4. The method of claim 2, further comprising operating an orchestration component within the CMA, including:
    operating decision logic configured to select between the FTO component and the VTO component when responding to requests to perform cloud-based data storage operations;
    implementing a set of policies for performing the cloud-based storage operations on a set of data elements in the data storage system; and operating a scheduler configured to perform at least one of the cloud-based storage operations on a predetermined schedule.

5. The method of claim 4, wherein the decision logic is configured to (i) select the FTO component when responding to requests to perform file archiving to the cloud and (ii) select the VTO component when responding to requests to perform at least one of (a) snapshot-shipping of file systems to the cloud and (b) archiving of LUNs (Logical UNits) to the cloud.

6. The method of claim 4, further comprising:
obtaining, by the CMA, an identifier of a data element in the data storage system upon which a cloud-based storage activity is to be performed; and
directing, by the CMA and in accordance with the predetermined schedule, performance of the cloud-based storage activity on the identified data element in accordance with the set of policies.

7. The method of claim 6, wherein the CMA has a REST interface to a component of the data storage system, and wherein obtaining the identifier of the data element includes querying, by the CMA, the component of the data storage system over the REST interface.

8. The method of claim 6, further comprising operating a user-interface component of the CMA, the user-interface component configured to receive commands from a user to identify data elements on which to perform cloud-based storage activities.

9. The method of claim 6, further comprising operating a user-interface component of the data storage system, the user-interface component configured to (i) receive commands from a user to configure the data storage system and (ii) receive commands from the user to identify data elements on which to perform cloud-based storage activities.

10. The method of claim 2, wherein the cloud-based objects that store contents of the files and the cloud-based objects that store contents of the volumes reside in the same cloud-based data store, the method thereby using objects in the cloud-based data store as a common base for storing both files and volumes.

11. A computerized apparatus, comprising control circuitry constructed and arranged to:
operate an FTO (file-to-object) component on a computing machine, the FTO component configured to convert between files hosted by a data storage system and cloud-based objects that store contents of the files, the cloud-based objects that store contents of the files being accessible to the data storage system via a cloud-based API (application program interface) component running on the computing machine;
operate a VTO (volume-to-object) component on the computing machine, the VTO component configured to convert between volumes hosted by the data storage system and cloud-based objects that store contents of the volumes, the cloud-based objects that store contents of the volumes being accessible to the data storage system via the cloud-based API component;
in response to a request from the data storage system to access a file, (i) transform, by the FTO component, the request to access the file into a corresponding set of requests to access a first set of cloud-based objects and (ii) access, by the cloud-based API component, the first set of cloud-based objects to obtain data of the file from a set of cloud-based data stores; and
in response to a request from the data storage system to access a volume, (i) transform, by the VTO component, the request to access the volume into a corresponding set of requests to access a second set of cloud-based objects and (ii) access, by the cloud-based API component, the second set of cloud-based objects to obtain data of the volume from the set of cloud-based data stores.

12. A computer program product including a set of non-transitory, computer-readable media having instructions which, when executed by control circuitry of a computerized apparatus, cause the computerized apparatus to perform a method of managing cloud-based storage, the method comprising:
operating an FTO (file-to-object) component on a computing machine, the FTO component configured to convert between files hosted by a data storage system and cloud-based objects that store contents of the files, the cloud-based objects that store contents of the files being accessible to the data storage system via a cloud-based API (application program interface) component running on the computing machine;
operating a VTO (volume-to-object) component on the computing machine, the VTO component configured to convert between volumes hosted by the data storage system and cloud-based objects that store contents of the volumes, the cloud-based objects that store contents of the volumes being accessible to the data storage system via the cloud-based API component;
in response to a request from the data storage system to access a file, (i) transforming, by the FTO component, the request to access the file into a corresponding set of requests to access a first set of cloud-based objects and (ii) accessing, by the cloud-based API component, the first set of cloud-based objects to obtain data of the file from a set of cloud-based data stores; and
in response to a request from the data storage system to access a volume, (i) transforming, by the VTO component, the request to access the volume into a corresponding set of requests to access a second set of cloud-based objects and (ii) accessing, by the cloud-based API component, the second set of cloud-based objects to obtain data of the volume from the set of cloud-based data stores.

13. The computer program product of claim 12, wherein the method further comprises operating the FTO component, the VTO component, and the cloud-based API component together within a CMA (cloud management appliance), the CMA operating within a virtualized processing instance on the computing machine, the virtualized processing instance realized as one of (i) a virtual machine or (ii) a container that provides an isolated userspace instance.

14. The computer program product of claim 13, wherein the method further comprises operating an orchestration component within the CMA, including:
operating decision logic configured to select between the FTO component and the VTO component when responding to requests to perform cloud-based data storage operations;
implementing a set of policies for performing the cloud-based storage operations on a set of data elements in the data storage system; and
operating a scheduler configured to perform at least one of the cloud-based storage operations on a predetermined schedule.

15. The computer program product of claim 14, wherein the decision logic is configured to (i) select the FTO component when responding to requests to perform file archiving to the cloud and (ii) select the VTO component when responding to requests to perform at least one of (a)

snapshot-shipping of file systems to the cloud and (b) archiving of LUNs (Logical UNits) to the cloud.

16. The computer program product of claim 14, wherein the method further comprises:
obtaining, by the CMA, an identifier of a data element in the data storage system upon which a cloud-based storage activity is to be performed; and
directing, by the CMA and in accordance with the predetermined schedule, performance of the cloud-based storage activity on the identified data element in accordance with the set of policies.

17. The computer program product of claim 16, wherein the CMA has a REST interface to a component of the data storage system, and wherein obtaining the identifier of the data element includes querying, by the CMA, the component of the data storage system over the REST interface.

18. The computer program product of claim 16, wherein the method further comprises operating a user-interface component of the CMA, the user-interface component configured to receive commands from a user to identify data elements on which to perform cloud-based storage activities.

19. The computer program product of claim 16, wherein the method further comprises operating a user-interface component of the data storage system, the user-interface component configured to (i) receive commands from a user to configure the data storage system and (ii) receive commands from the user to identify data elements on which to perform cloud-based storage activities.

20. The computer program product of claim 13, wherein the cloud-based objects that store contents of the files and the cloud-based objects that store contents of the volumes reside in the same cloud-based data store, the method thereby using objects in the cloud-based data store as a common base for storing both files and volumes.

21. The method of claim 1, wherein the set of cloud-based data stores are object-based data stores, wherein the first set of cloud-based objects are object-based data, and wherein the second set of cloud-based objects are object-based data.

* * * * *